April 10, 1945.　　　E. D. CLICKNER　　　2,373,225
CONTROL QUADRANT
Filed Dec. 10, 1943
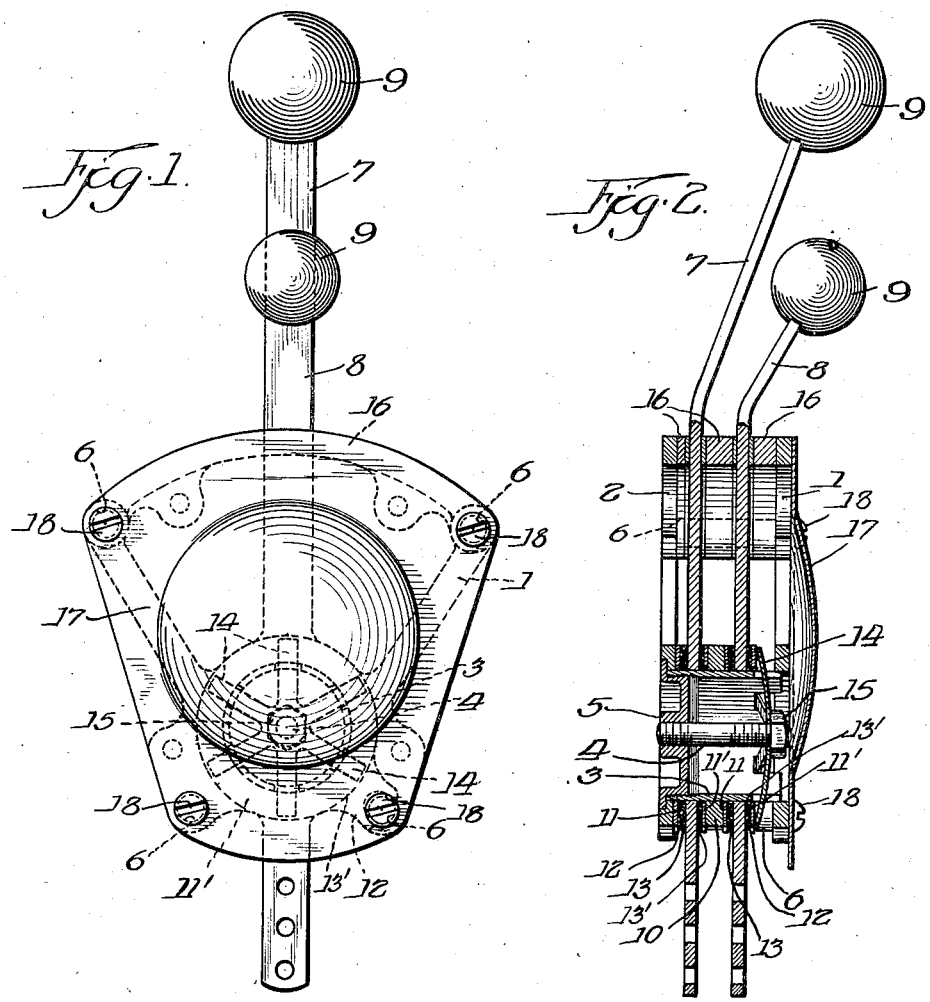
Inventor:
Earle D. Clickner
By W. F. Kellogg, Atty.

Patented Apr. 10, 1945

2,373,225

UNITED STATES PATENT OFFICE 2,373,225

CONTROL QUADRANT

Earle D. Clickner, Kalamazoo, Mich., assignor to Shakespeare Products Company, Kalamazoo, Mich., a corporation of Michigan Application December 10, 1943, Serial No. 513,789

2 Claims. (Cl. 74—531)

This invention relates to improvements in control devices, and particularly, to control quadrants, such for example, as are employed in aircraft, though also usable in land and marine vehicles; the invention having for its prime desideratum to provide a control quadrant, commonly characterized as a throttle quadrant, so constructed that the different control levers thereof will be, at all times, capable of adjustment or operative movement without hazardous or undesirable impedance, irrespective of climatic, temperature or like conditions, i. e., maintaining their operational efficiencies at maximum during and throughout all periods of usage whereby to ameliorate the transmittal or control motion to those apparatuses and/or devices connected to the same.

The difficulties heretofore experienced in the production of control quadrants, from the standpoint of smooth frictional operation, are well known to and appreciated by workers skilled in this art. It is generally recognized that the control levers of these devices, while having a certain predetermined amount of drag normally imparted thereto, must have no extraneous impedance offered to or imposed thereupon during operative adjustment or movement of the same.

The operation of control quadrants is critical, for many reasons. Their control adjustments, oftentimes, are extremely fine. Thus, if other than normal or the proper predetermined resistance is offered to operative adjustment thereof, faulty control and serious hazard is encountered. Moreover, it is vitally necessary, for manifest reasons, that the control levers of these quadrants shall be constantly or ever capable of normal, unimpeded movement, whereby to immediately and faithfully respond to those operative pressures which may or shall be directed thereto during their periods of use. If, because of the existence of extraneous impedance, they shall become difficult of immediate—even split-second—adjustment or operation, catastrophic results may well occur.

In consequence of the foregoing, quadrant controls, and particularly, those used upon airplanes, must not only be constructed and installed with the greatest possible care, but it is required that they shall not have any matters or materials applied thereto which may, in the least, abnormally impede or hinder their operation. In example, the application of grease and/or other lubricant to the bearing surfaces of quadrants installed in certain types of aircraft, is absolutely prohibitive. Such types of aircraft may reasonably be expected to traverse a course taking the same through a range of temperatures of from 120° F. to 60° F. below zero. Any known grease or lubricant would change its consistency so widely, through the indicated range or an even materially lesser one, that the operation of the control lever or levers, whose bearing surfaces were provided therewith, would be adversely affected.

Heretofore, the design of control quadrants that have been more widely used, have depended for frictional drag and so-called smooth friction, upon brass friction disks or rings bearing against the adjacent portions of steel control levers. Such devices, however, are not overall satisfactory because, amongst other reasons, they expand or contract when subjected to different temperatures and hence, will not exert and maintain constantly uniform pressure or frictional drag upon the levers of an equipped quadrant; they are prematurely worn to such extents as to be unable to maintain constantly uniform pressure or frictional drag upon the control levers, and they are non-compensating as respects the progressive wearing thereof, necessitating comparatively frequent adjustment and readjustment of the quadrant pressure transmitting means to provide the required frictional drag or resistance to pivotally operative movement of the control levers.

I have developed a means, which, when used in connection with the levers of control quadrants, produces new and totally unexpected results along with highly meritorious and beneficial teachings to the industry, in that the same will function, irrespective of climatic, temperature or similar conditions, to impart constant and uniform pressure and frictional drag thereto, whereby to cause the same to be positively retained in their particular control adjusted positions and at the same time, to be capable of shifting movement for further control adjustment with the application of strictly smooth and uniform frictional resistance thereto and without extraneous impedance; moreover, a device of such rugged characteristics as will efficiently and operatively endure for and during prolonged periods of usage. Also, by the use of my invention as a frictional braking means for the levers of a control quadrant, any and all possibility of "freezing," jamming or sticking of said levers, during their respective periods of use, will be absolutely prevented, hence, faithfully and constantly assuring and safeguarding their satisfactory operation and/or adjustment notwithstanding the degree or extent of such adjustment, i. e., whether the adjustment be of an extremely fine character, as is so often required, or conversely; all without the need or use of lubricants of any kind or sort, which, as hereinabove set out, are so result unsatisfactory and hazardous.

Other objects and meritorious features of the invention will be in part obvious and in part pointed out hereinafter.

In order that the invention and its mode of operation may be readily understood by those skilled in the art to which it appertains, I have in the accompanying drawing and the detailed description based thereon, set out one embodiment of my invention.

In the drawing:

Figure 1 is a side elevation of a control quadrant, embodying the invention.

Figure 2 is a vertical transverse section through the improved control quadrant, and Figure 3 is a detail in elevation of one of the hard felt friction pieces or disks.

Having more particular reference to the drawing, in connection with which like characters of reference will designate corresponding parts throughout, it will be noted that I have illustrated the hereinafter described embodiment of my invention as being that type of control quadrant employing but a pair of control levers. Nevertheless, it is to be fully understood that the type of quadrant to which the invention is applied, may differ. That is to say, the control quadrant may be provided with one or two or more levers, such as conditions or preference may dictate. Said illustrated control quadrant comprises front and back plates 1 and 2, respectively. The front plate 1 and the back plate 2 are provided with suitable circular openings, the latter of which receives therein or therethrough a screw threaded retainer 3 carrying a screw threaded stud 4, of appropriate length, and being turned into engagement with the adjacent screw threaded end of a sleeve-like hub 5. Thus, it will be seen that the hub 5 is supported from the back plate 2; moreover, that the remaining end of said hub is adapted to be received, to an extent, within the aforesaid circular opening provided the front plate 1.

To fixedly interconnect the front and back plates 1 and 2, connecting studs 6 are secured to relatively spaced portions of the normally inner side of the back plate 2 and are disposed at substantially right angles thereto. The remaining end portions of these connecting studs are formed with screw threaded pockets, the purpose of which will be hereinafter more fully described. Control levers 7 and 8, each having circular or collar-like intermediate bearing or mounting portions, are provided the quadrant and, as will be noted upon reference to the accompanying drawing, are rotatably mounted upon the hub 5. Each of the control levers 7 and 8 may be and preferably are provided with suitable knobs 9 upon which appropriate indicating matter may be presented whereby to facilitate their selection.

The control levers 7 and 8, as will be understood, are mounted upon the hub 5 in relatively spaced relationship. To effect this mounting, a friction disk 11 is received over the hub 5 and is arranged adjacent and bearing upon the near side or face of the back plate 2. Said friction disk 11 is formed or provided with a radially extended bifurcated lug 12 adapted to be engaged with or over one of the normally lowermost connecting studs 6, in order to retain the same in a nonrotating position with respect to the hub 5 and for a purpose which will be subsequently apparent.

A friction braking disk or piece 13 is now engaged over and about the hub 5 and is positioned adjacent the near side of the friction disk 11. It is the function of this friction braking disk 13, to transmit a constant frictional drag or impedance of predetermined degree, to the particularly adjacent control lever—presently described—during its pivotal or rotary control movement. The ring is constructed of hard felt, preferably a specie or type of felt known to the industry as Spanish felt.

The mounting portion of the control lever 7 is now engaged over and about the hub 5 and is moved to a position adjacent and bearing upon the corresponding side of the hard felt friction braking disk 13, whereupon a second and similar hard felt friction braking disk 13' is engaged with or over the hub 5 and moved into contact with the corresponding or near side of said mounting portion of the control lever 7.

A second friction disk, identified by the numeral 11', similar in construction to the friction disk 11, is engaged over and about the hub 5 and bears upon the near side of the friction braking disk 13', having its radially disposed bifurcated lug portion anchored with respect to the aforesaid connecting stud 6 to prevent its rotation upon the hub 5. Thereupon, a ring-like spacer element, identified at 10, is snugly though movably engaged over and about the hub 5 adjacent to and bearing upon the friction disk 11'.

The second or remaining control lever 8, is similarly rotatably mounted upon the hub 5 and, as will be noted upon reference to the accompanying drawing, is provided with the friction disks 11 and 11', corresponding in construction and arrangement to the previously described friction disks, and with hard felt friction braking disks 13 and 13', corresponding in construction and arrangement or disposition with the previously described friction braking disks 13 and 13', i. e., those friction braking disks which have bearing upon and contact with the opposite sides of the intermediate rotatable mounting portion of the control lever 7.

With a view toward providing the control quadrant with means for applying a predetermined degree or amount of pressure to the friction disks 11 and 11', the friction braking disks 13 and 13' and the mounting portions of the control levers 7 and 8, whereby an effectual frictional drag or impedance will be imparted to the latter, a spider-like spring securing device 14 is engaged over the free and extended end portion of the stud 4 and has the outer portion of its respective legs overlying and bearing directly upon adjacent portions of the outermost friction disk 11'. An adjusting and locking nut 15 is turned into engagement with the screw threaded free and portion of the stud 4 and bears upon the adjacent intermediate portion of the spring securing device 14. Thus, by inward or outward adjustment or turning of the nut 15 upon said screw threaded portion of the stud 4, greater or lesser pressures may be applied or directed to the mounting portions of the control levers 7 and 8 through their respective friction disks 11 and 11' and friction braking disks 13 and 13'.

The outer and normally upper end portions of the control levers 7 and 8 are extended from and beyond the normally upper end of the control quadrant, in which positions their respective knobs or handles 9 may be conveniently seen and engaged.

Usual arcuate guides, generally indicated by the numeral 16, are provided at the upper portions of the front and back plates 1 and 2 and, as will be readily understood, serve to guide said control levers through predetermined paths of movement or travel during their respective operative movements; the adjacent or normally uppermost connecting studs 6, passing through openings formed in appropriate or adjacent portions of said guides 16 whereby to fixedly mount or retain the same with respect to the control quadrant construction.

The front plate 1 is provided with a suitable and usual cover plate 17 having appropriate indicia inscribed or otherwise presented on its face side. To secure said front plate 1 and cover plate 16 to the quadrant construction, connecting screws 18 are passed through aligned openings formed in each and into screw threaded engagement with the hereinbefore described screw threaded pockets formed in the outer or free end portions of the connecting studs 6.

As is usual in the construction or formation of control levers for quadrants of the type herein described, the normally inner or lower end portions of each of the levers 7 and 8 extend for distances below and beyond the adjacent or corresponding end of the quadrant and are suitably equipped or provided to permit or facilitate the engagement of connecting devices (not shown) thereto, which connecting devices, in turn, extend into operative engagement or connection with devices or apparatuses to be controlled by their respective control levers (also not shown).

The friction braking disks or pieces 13 and 13', adjacent and bearing upon the mounting portions of the control levers 7 and 8, to insure best working results, i. e., the application of a constant and uniform frictional drag upon said levers, and, in consequence, the desired smooth friction efficiencies, are, as above stated, made of hard felt. Moreover, I have found through long and extensive research and experimentation that a highly desirable and satisfactory form of felt is that characterized or known as Spanish felt hereinafter described.

It is important that the fibres or noils constituting the felt material preferably used in making the friction braking disks 13 and 13' shall have a maximum of rough or serrated surface, so that during the shrinking and fulling processes, these roughened portions or serrations will thoroughly interlock with others running in opposed directions; thus, effecting a firm adhesion or holding-together of the individual fibres. With shrinking of the fibres or noils, as above indicated, the usual carding is done and the resultant batts are carefully and thoroughly hardened and fulled to impart a degree of hardness to the material.

Because of the aforesaid prohibition of grease or oil coming in contact with the bearing surfaces of the movable or rotatable parts of the control quadrant, as for example, the control lever mountings, and in some constructions, the metal friction disks or rings 11 and 11' of the assembly, it is desirable that the felted material shall be carefully scoured or cleansed. The material is thereupon further hardened by passing it through pressure rolls (calendered) and then brushed to raise its nap in order that the latter may be closely and thoroughly cut therefrom by means of suitable clipping or cutting machinery, well known in the art, after which, and to insure the smoothest possible surfaces upon the felt, the material is polished, as by being subjected to the fine abrasive action of sanding rolls, etc.

Felt material produced in the manner above generally described, is characterized in the industry as Spanish felt, and is possessed of a high degree of hardness, toughness and ductility, and has a comparatively smooth surface finish. However, notwithstanding its hardness and smoothness, it retains a sufficient degree of resiliency or yieldability and frictional surface, most efficient for the application of frictional drag or resistance to the surfaces (metal surfaces) contacting with and moving over the same. The character of this frictional drag may be varied or adjusted, even to an extremely fine degree, by the application of appropriate pressure to its hard, though yieldable body. The body yieldability and the friction producing surfaces of the material will insure the transmission of a constantly even and uniform frictional drag to a metal surface moving thereby and thereover.

From the foregoing, it will be readily seen and understood that friction braking disks or pieces, such as hereinbefore identified by the reference characters 13 and 13', constructed of felt material, as hereinbefore set forth, when interposed between the hub mountings of the control levers 7 and 8, and the metal friction disks or rings 11 and 11', and then subjected to a predetermined pressure by adjustment of the nut 15 on the screw threaded stud 4, will impart definite drag to the control levers 7 and 8 as they are rotatably and operatively adjusted or shifted.

Because of the resiliency or yieldability, plus the frictional qualities of the felt friction braking disks 13 and 13', the control levers 7 and 8 will be subjected to a constant and uniform frictional drag or smooth friction throughout their entire ranges or paths of operative movement. Hence, they will be operatively responsive to the same amount of pressure required to move them against the restraining influence of the applied frictional drag, at any point throughout their normal paths of adjusting movement, and so, readily and effectually shifted to any desired point or degree of adjustment. Moreover, wear upon the felt friction braking disks 13 and 13' will, to an extent, be automatically compensated for by reason of their inherent body resiliency, and can be additionally and adequately compensated for by further and required adjustment or turning of the nut 15 upon the screw threaded stud 4.

It is also of importance to here note that by the use of felt material, embodying the properties of body resilience, and, in consequence, compressibility, plus excellent friction qualities, the friction braking disks 13 and 13' made thereof will be permitted of materially smoother frictional drag and will be easier and quicker of manufacture because of its bodily "give," plus the fact that production tolerances need not be held to as closely as required in the production of metal friction rings. Furthermore, because of the characteristics of the felt braking disks 13 and 13', it is possible to not put such elaborate and costly finishes on the bearing surfaces of the metal constructed disks, spacers or control levers contacting therewith, without in any manner detracting from operation efficiency. Additional production economies may be effected without entailing efficiency loss, by making the friction disks 11 and 11' of steel instead of brass, for the reason that the felt friction braking disks 13 and 13' will be interposed or positioned between the same and the bearing surfaces of the mounting portions of the control levers 7 and 8.

The friction braking disk bodies made of Spanish felt, herein described, will each be possessed of limited inherent yieldability. Their surface portions are hard and tough relative to the bodies thereof, by reason of the calendering thereof, as aforesaid, while such portions, by being closely clipped or cut and then polished, will have a minimum of nap thereon. Consequently, it will be understood and appreciated that the friction braking disks will, when operatively installed or positioned, provide a uniform surface overall frictional braking efficiency.

Whereas, I have heretofore described, with some degree of particularity, my improved form of frictional braking disk or ring as being produced from certain types or characters of felt, especially, that type of felt known to and identified in the industry as Spanish felt, I wish it understood that the range of the invention is quite sufficiently wide or embrasive to include fibrous and similar materials other than felt; provided, that the physical properties thereof do not include grease, but do include inherent body resiliency or yieldability and frictional drag or resistance qualities approximating those of the stated types of felt. If, by way of illustration, such other materials, when embodied in disk or ring form and employed as or similar to the above, shall be possessed of limited body yieldability, with a sufficient degree of hardness to successfully resist disintegration and premature wear when a metal body, under pressure, is moved over its surface or surfaces (or vice versa), and shall, under such conditions, have a soft, substantially non-abrading though firm frictional engagement with said metal body whereby to transmit a constant, uniform and smooth frictional drag or impedance thereto, during and throughout its course of movement, this, I consider clearly and fully within the province of my invention.

I claim:

1. A friction braking device for quadrant controls which includes a frame, a hub supported on the frame, friction disks non-rotatably mounted on the hub and control levers rotatably mounted on the hub between the friction disks, comprising disks, each consisting of a felted fibrous body having a predetermined degree of inherent yieldability and hardened and toughened smooth bearing faces, between the adjacent sides of the friction disks and the control levers and having frictional braking contact with the same.

2. A friction braking device, comprising in combination with a quadrant control including a frame, a hub thereon, friction disks non-rotatably mounted on the hub and control levers each having collar-like bearing portions rotatably engaged about the hub; braking disks engaged about and rotatable on said hub and arranged between the adjacent sides of the friction disks and the control levers having frictional braking engagement therewith, each of said braking disks consisting of a felted fibrous body possessed of a pre-determined degree of inherent body yieldability and each having its several opposite sides hardened and toughened to a degree materially greater than its respective body portion and the fibers of the braking disks adjacent to and constituting such opposite sides cut sufficiently short to provide uniform surface overall frictional braking efficiency thereto.

EARLE D. CLICKNER.